United States Patent [19]

Potter et al.

[11] Patent Number: 5,091,475
[45] Date of Patent: Feb. 25, 1992

[54] POWDER COATINGS WITH FLAT FINISHES

[75] Inventors: Terry A. Potter, New Martinsville, W. Va.; Hugh C. Grubbs, Cannonsburg, Pa.

[73] Assignee: Mobay Corporation, Pittsburgh, Pa.

[21] Appl. No.: 380,956

[22] Filed: Jul. 17, 1989

[51] Int. Cl.$^5$ .................. C08G 18/67; C08G 18/68; C09D 175/14; C09D 175/16
[52] U.S. Cl. .................. 525/124; 525/376; 525/528; 528/45; 528/75; 528/85
[58] Field of Search .................. 525/124, 376, 528; 528/45, 75, 85

[56] References Cited

U.S. PATENT DOCUMENTS

| | | | |
|---|---|---|---|
| 3,202,636 | 8/1965 | Windemuth et al. | 528/85 |
| 3,931,117 | 1/1976 | Leonard | 528/45 |
| 4,055,550 | 10/1977 | Panandiker et al. | 528/45 |
| 4,061,845 | 12/1977 | Fabris et al. | 528/75 |
| 4,162,274 | 7/1979 | Rosenkranz | 525/528 |
| 4,252,923 | 2/1981 | Konig et al. | 525/452 |
| 4,289,684 | 9/1981 | Kallaur | 525/28 |
| 4,369,301 | 1/1983 | Konig et al. | 528/45 |
| 4,480,008 | 10/1984 | Farronato et al. | 428/425 |
| 4,687,813 | 8/1987 | Lenz et al. | 525/124 |

Primary Examiner—Morton Foelak
Assistant Examiner—Rabon Sergent

[57] ABSTRACT

The present invention is directed to coating compositions comprising a) polyisocyanates having a content of isocyanate groups blocked by blocking agents of about 10 to 35% by weight and containing about 0.5 to 10.0% by weight of structural units corresponding to the formula $$-CO-NH-NH-CO-$$

and b) polyhydroxy polyacrylates in an amount sufficient to provide an equivalent ratio of blocked isocyanate groups to hydroxyl groups of about 0.5:1.0 to 2.0:1.0.

The present invention is also directed to the coatings prepared from these coating compositions.

Finally, the present invention is directed to blocked polyisocyanates which have a content of isocyanate groups blocked by blocking agents of about 10 to 35% by weight and about 0.5 to 10.0% by weight (calculated as $-CO-NH-NH-CO-$, MW 86) of structural units corresponding to the formula $$-CO-NH-NH-CO-Q-$$

wherein
Q represents $-NH-NH-CO-$ or the group $R-(-CO-NH-NH-CO-)_n$
R is an $n+1$ valent hydrocarbon radical and
n has a value from 1 to 3.

16 Claims, No Drawings

POWDER COATINGS WITH FLAT FINISHES

BACKGROUND OF THE INVENTION

1. Field of the Invention

The present invention is directed to powder coating compositions and coatings produced therefrom which have flat finishes.

2. Description of the Prior Art

Polyurethane stoving lacquers are known and described in U.S. Pat. Nos. 4,055,550; 4,252,923; 4,369,301; and 4,480,008. The coating compositions may be processed as a solution or as a powder and are based on a polyhydroxyl component and a polyisocyanate component wherein the isocyanate groups are completely or partially blocked with a blocking agent to prevent premature reaction of the components. A cross-linking reaction to form the coating only occurs at elevated temperatures which are sufficient to release the blocking agent.

Regardless of whether the polyhydroxyl component is a polyester polyol or a polyacrylate polyol, the coatings prepared therefrom generally have a high gloss. In order to produce coatings with a flat or matt finish, it is necessary to add flatting agents to the coating composition. However, the incorporation of these flatting agents often reduces other desirable and necessary properties of the coating.

U.S. Pat. No. 4,480,008 is directed to the incorporation of dihydroxy carboxylic acids during the preparation of the blocked polyisocyanate component in order to provide coatings having a flat finish.

It is an object of the present invention to provide stoving compositions which may be used to prepare coatings having a flat finish. It is an additional object of the present invention to provide stoving compositions which may be used to prepare coatings which retain the desirable and necessary properties of stoving lacquers. These objects may be achieved in accordance with the present invention by the incorporation of certain components during the preparation of the blocked polyisocyanate as described hereinafter.

U.S. Pat. No. 4,369,301 is directed to the production of stoving compositions based on a blocked polyisocyanate which has been prepared by reacting an organic polyisocyanate with compounds containing hydroxyl groups and structural units corresponding to the formula

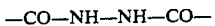

and/or the formula

H$_2$N—NH—CO—O—

Coatings prepared from the polyisocyanate component disclosed therein possess improved resistance to yellowing. There is no disclosure in this reference that the disclosed structural units provide coatings having a flat finish when the blocked isocyanates are reacted with polyacrylate polyols.

SUMMARY OF THE INVENTION

The present invention is directed to coating compositions comprising a) polyisocyanates having a content of isocyanate groups blocked by blocking agents of about 10 to 35% by weight and containing about 0.5 to 10.0 % by weight of structural units corresponding to the formula

—CO—NH—NH—CO— and b) polyhydroxy polyacrylates in an amount sufficient to provide an equivalent ratio of blocked isocyanate groups to hydroxyl groups of about 0.5:1.0 to 2.0:1.0.

The present invention is also directed to the coatings prepared from these coating compositions.

Finally, the present invention is directed to blocked polyisocyanates which have a content of isocyanate groups blocked by blocking agents of about 10 to 35% by weight and about 0.5 to 10.0 % by weight (calculated as —CO—NH—NH—CO—, MW 86) of structural units corresponding to the fformula

wherein

Q represents NH—NH—CO— or the group R—(-CO—NH—NH—

R is an n+1 valent hydrocarbon radical and n has a value from 1 to 3.

DETAILED DESCRIPTION OF THE INVENTION

Suitable polyisocyanates for preparing the blocked polyisocyanates include any aliphatic, cycloaliphatic, araliphatic or aromatic isocyanates, preferably diisocyanates, having a molecular weight of about 168 to 300. Examples include 2,4-and/or 2,6-diisocyanatotoluene, 2,4'-and/or 4,4'—diisocyanatodiphenylmethane, the methyl substituted derivatives of the last mentioned diisocyanates, 1,6-hexamethylene diisocyanate, 1-isocyanato-3,3,5-trimethyl5-isocyanatomethyl cyclohexane (isophorone diisocyanate or IPDI), m- and/or p-xylene diisocyanate, α,α,α',α'-tetramethyl-m- and/or -p-xylene diisocyanate, 4,4'-diisocyanatodicyclohexylmethane, 1-methyl-2,4- and/or -2,6-diisocyanatocyclohexane and mixture of the these diisocyanates.

Also suitable are reaction products of these diisocyanates with subequivalent quantities of low molecular weight hydroxyl compounds having a molecular weight of 62 to about 400 and containing 2 to 4 hydroxyl groups. Examples of these low molecular weight polyols include ethylene glycol, diethylene glycol, triethylene glycol, propylene glycol, dipropylene glycol, tripropylene glycol, tetrapropylene glycol, butane diol, hexane diol, 4,4'-dihydroxydicyclohexylmethane, 1,4-bis-(2-hydroxyethoxy)-benzene, trimethylol propane, glycerine, pentaerythritol and mixtures of these polyols. Also suitable are polyisocyanates having biuret groups and prepared by biuretizing the above-mentioned diisocyanates, and in particular 1,6-hexamethylene diisocyanate; polyisocyanates having uretdione groups as described, for example, in German Offenlegungsschrift 2,502,934; and polyisocyanates having isocyanurate groups and obtained by trimerizing the above mentioned diisocyanates, preferably 1,6-hexamethylene diisocyanate, 2,4- and/or 2,6-diisocyanatotoluene, isophorone diisocyanate and "mixed trimers" prepared from mixtures of these diisocyanates, in accordance with European Patent Application No. 10,589, German Offenlegungsschrift Nos. 2,707,656 and 2,806,731 and U.S. Pat. No. 4,324,879.

The polyisocyanates generally have an NCO content of about 10 to 50 percent by weight, preferably about 14 to 35 percent by weight. Preferred polyisocyanates are the reaction products of diisocyanates having aliphatically and/or cycloaliphatically bound isocyanate groups with the low molecular weight polyols described above.

In order to incorporate groups corresponding to the formula

—CO—NH—NH—CO—, the previously described polyisocyanates are reacted with carbodihydrazide $H_2N-NH-CO-NH-NH_2$;

adducts of hydrazine or hydrazine hydrate with carboxylic acids containing 2 to 4 carboxylic acid groups; and reaction products of hydrazine or hydrazine hydrate with cyclic alkylene carbonates.

Reaction products of hydrazine or hydrazine hydrate with polycarboxylic acids having 2 to 4, preferably 2 carboxylic acid groups correspond to the formula $H_2N-NH-CO-R-(CO-NH-NH_2)_n$ wherein R is an n+1 valent hydrocarbon radical and n has a value from 1 to 3, preferably 1. Preferably R represents the hydrocarbon radical obtained by removing the acid groups from an aliphatic polycarboxylic acid, preferably dicarboxylic acid, having 2 to 10, preferably 2 to 6 carbon atoms.

Suitable alkylene carbonates for reaction with hydrazine or hydrazine hydrate include those having 5- or 6-membered rings such as ethylene glycol carbonate (2-oxo-1,3-dioxolane), propylene glycol carbonate (2-oxo-4-methyl-1,3-dioxolane), 2-oxo-4-hydroxymethyl-1,3-dioxolane (reaction product of 1 mole of glycerine with 1 mole of diphenyl carbonate) and 1,3-dioxanone-(2)-ring compounds obtained, for example by reacting 1,3-propane diol or neopentyl glycol with diphenyl carbonate. Ethylene glycol carbonate and propylene glycol carbonate are preferred. Suitable methods for the preparation of the adducts of hydrazine or hydrazine hydrate with these cyclic carbonates are disclosed in U.S. Pat. No. 4,369,301 (herein incorporated by reference in its entirety).

Suitable blocking agents which are suitable for preparation of the blocked polyisocyanates in accordance with the present invention are known blocking agents for polyisocyanates. Examples of these blocking agents include monophenols such as phenol, the cresols, the trimethyl phenols and the tert butyl phenols; tertiary alcohols such as tertiary butanol, tertiary amyl alcohol and dimethylphenyl carbonyl; compounds which easily form enols such as acetoacetic ester, acetyl acetone and malonic acid derivatives, e.g., malonic acid diethylester; secondary aromatic amines such N-methylaniline, the N-methyl toluidines, N-phenyl toluidine and N-phenyl xylidene; imides such as succinimide; lactams such as ε-caprolactam and δ-valerolactam; oximes such as acetone oxime, butanone oxime and cyclohexanone oxime; mercaptans such as methylmercaptan, ethyl mercaptan, butyl mercaptan, 2mercapto-benzothiazole, α-napthyl mercaptan and dodecyl mercaptan; and triazoles such as 1H-1,2,4-triazole. Preferred blocking agents are acetone oxime and especially ε-caprolactam.

The reaction between the organic polyisocyanate, hydrazine derivative and blocking agent is generally conducted at a temperature of about 50° to 200° C., preferably about 100 to 160° C. The reactants are used in such quantities that the blocked polyisocyanates contain about 10 to 35%, preferably about 15 about 15 to 35% by weight of blocked isocyanate groups (calculated as NCO, molecular weight equals 42) and about 0.5 to 10%, preferably about 1 to 5% by weight of structural units corresponding to the formula

—CO—NH—NH—CO—.

The percentages are based on the total weight of the blocked polyisocyanate excluding the blocking agent.

The organic polyisocyanate may be reacted with the hydrazine adduct and the blocking agent successively or simultaneously. When the blocking reaction is conducted before the reaction with the hydrazine adduct, care must be taken that all of the isocyanate groups are not blocked by the blocking agent. According to a preferred embodiment of the process, the starting polyisocyanate is reacted simultaneously with the hydrazine adduct and the blocking agent using a solution of the hydrazine adduct in the blocking agent. This reaction is preferably carried out such that the organic polyisocyanate is initially partially blocked with some of the blocking agent and the partly blocked polyisocyanate is then reacted with a solution of the hydrazine adduct in the remainder of the blocking agent.

The present process may be carried out in the absence of solvents or in the presence of suitable inert solvents such as ethylene glycol monoethyl ether acetate, butyl acetate, methyl ethyl ketone, methyl isobutyl ketone, toluene or xylene. The reaction according to the present invention is generally carried out with heating and within the temperature ranges specified until the homogeneous melt or solution is produced. Auxiliaries or solvents which are optionally used and excess blocking agent which may be present are then removed, for example by distillation.

In order to obtain the coating compositions according to the present invention, the blocked polyisocyanates are blended with polyhydroxy polyacrylates. These polyhydroxy polyacrylates are known and may be prepared by known methods such as those described in European Patent Office Publication 68,383, German Patentschrift 2,460,329, British Patent 1,515,868, U.S. Pat. No. 3,002,959, U.S. Pat. No. 3,375,227 or German Auslegeschrift 1,038,754. The polyhydroxy polyacrylates are generally prepared by the radical polymerization or copolymerization of a hydroxyalkyl ester of an unsaturated carboxylic acid, preferably acrylic or methacrylic acid, with itself or preferably together with other hydroxyl-free unsaturated monomers. The polyhydroxy polyacrylates generally have a molecular weight, as determined by vapor pressure osmometry of 232 to about 100,000, preferably about 1000 to 80,000, more preferably about 2000 to 50,000, and a hydroxyl group content of about 0.017 to 15% by weight, preferably about 0.1 to 10% by weight and more preferably about 0.5 to 5% by weight. The polyhydroxy polyacrylates preferably have at least two alcoholic hydroxyl groups per molecule as a statistical average although in principle it would be possible to use the corresponding monohydroxyl compounds. The molecular weights indicated for the polyacrylates containing hydroxyl groups are number average molecular weights and not weight average molecular weights which may be determined by light scattering.

Suitable hydroxylalkyl esters include esters containing 2 to 8, preferably 2 to 4 carbon atoms in the alkyl group and obtained from α,β-unsaturated carboxylic acids having 3 to 5 carbon atoms, such as acrylic, methacrylic, fumaric, maleic, itaconic or crotonic acid. The acrylic and methacrylic acid esters are preferred. Hydroxyalkyl esters of the above-mentioned acids containing ether bridges in the alkyl groups may also be used but are less preferred. The particularly preferred monomers with alcoholic hydroxyl groups include the 2-hydroxyethyl-, 2- and 3-hydroxypropyl-, and 2-, 3- and 4-hydroxybutyl-acrylates and -methacrylates. These monomers containing alcoholic hydroxyl groups may be prepared, for example, by the reaction of the above-mentioned acids with epoxides such as alkylene or propylene oxide.

The polyhydroxy polyacrylates which are used may also be prepared by reacting the corresponding polyacrylates containing carboxylic acid groups with alkylene oxides such as propylene oxide and/or ethylene oxide in the presence of suitable alkoxylation catalysts such as tetrabutylammonium bromide. The starting materials for this alkoxylation reaction, i.e., the polyacrylates containing carboxylic acid groups, are obtained in known manner by the copolymerization of unsaturated carboxylic acids such as acrylic acid and/or methacrylic acid with unsaturated comonomers which do not contain carboxyl or hydroxyl groups. The preferred method for preparing the polyhydroxy polyacrylates is the copolymerization of the hydroxyalkyl esters of unsaturated carboxylic acids previously set forth.

The comonomers used for the above-mentioned hydroxyl group-containing monomers may be any α-β-olefinically unsaturated compounds in the molecular weight range of 28 to 350 which are free from hydroxyl groups such as ethylene, propylene, butene-1, hexene-1, octene-1, styrene, methylstyrene, divinyl benzene, various isomeric vinyl toluenes, esters of α,β-unsaturated carboxylic acids of the type exemplified above monohydric aliphatic alcohols having 1 to 18, preferably 1 to 10 carbon atoms, in particular the corresponding esters of acrylic or methacrylic acids such as the methyl, ethyl, N-butyl, N-pentyl, N-hexyl, 2-ethylhexyl or octadecyl esters of acrylic or methacrylic acid.

Neutral esters of polycarboxylic acids are also suitable comonomers, for example, itaconic, crotonic, maleic or fumaric esters of the monohydric alcohols exemplified above.

Acrylic acid, methacrylic acid, vinyl acetate, acrylonitrile, methacrylonitrile and dienes such as isoprene or butadiene are all suitable comonomers. Vinyl chloride may in principle also be used as a comonomer.

Particularly preferred polyhydroxy polyacrylates are obtained from about 10 to 50 parts by weight of hydroxyalkyl esters of acrylic or methacrylic acid, 0 to 80 parts by weight of styrene and/or -methylstyrene, about 10 to 90 parts by weight of an acrylic and/or methacrylic acid ester free from hydroxyl group of the type exemplified above and 0 to about 5 parts by weight of an α,β-unsaturated mono- or dicarboxylic acid of the type exemplified, in particular acrylic acid or methacrylic acid.

In order to prepare powder coating compositions in accordance with the present invention, the polyhydroxy polyacrylates and the blocked polyisocyanates are mixed and optionally provided with pigments, flowing agents, catalysts (tin compounds) and other conventional additives which are mixed in the melt into a homogeneous material in extruders at temperatures of about 100° C. to 120° C. The polyhydroxy polyacrylates and the blocked polyisocyanates are used in such quantities that about 0.6 to 1.2, preferably about 0.8 to 1.0 isocyanate group is provided for each hydroxyl group.

The solidified material is ground and adjusted to the required grain size of approximately 0.1 mm by sieving. The resulting powder lacquer may be applied to molded parts to be coated according to the convention powder application processes, for example, by electrostatic powder spraying. The coatings are hardened by heating to temperatures of about 150° C. to 220° C., preferably about 170° C. to 190° C. Hard, flat elastomeric coatings are obtained which have excellent anti-corrosion characteristics.

If it is desired to prepare solvent-containing stoving lacquers, solutions of the blocked polyisocyanates are mixed with solutions of the polyhydroxy polyacrylates and other conventional additives described above. Suitable solvents include toluene, xylene, butylacetate, ethylene glycol monoethyl ether acetate, methyl ethyl ketone, methyl isobutyl ketone, or N-methyl pyrrolidone. The solvents are generally present in quantities of about 30 to 60% by weight, based on the weight of the coating composition. These lacquers may be applied by spraying or roll coating. The coated parts may be stoved at about 120° to 250° C., depending on the blocking agent used and on the residence time provided in the furnace. Stoving lacquers of this type are used, for example, in tube lacquering or for coil coating sheets. The lacquer films exhibit good mechanical properties in addition to a desirable weather resistance.

The invention is further illustrated but is not intended to be limited by the following examples in which all parts and percentages are by weight unless otherwise specified.

EXAMPLES

Preparation of Proylene Carbonate/Hydrazine Hydrate Adduct

A mixture of 67.5 g of hydrazine hydrate (1.35 moles), 60 g of toluene and 290 g of propylene carbonate (2.8 moles) was heated to 90° C. for 2 hours. The water in the system was removed by azeotropic distillation with toluene under reduced pressure (water aspirator). The excess propylene carbonate (108 g) was removed by vacuum distillation to afford a mixture of the 1:1 and 2:1 propylene carbonate/hydrazine adducts. By calculation the product was present in an approximately 70/30 ratio on a molar basis and an approximately 55/45 ratio on a weight basis of the 1:1 and 2:1 adducts.

Preparation of Blocked Polyisocyanates

EXAMPLE 1

A mixture of 211.2 g of bis(4-isocyanatocyclohexyl) methane (Desmodur W, Mobay Corporation), and 163.9 g of ε-caprolactam were reacted at 80° C. until the isocyanate content (by dibutyl amine titration) reached a constant value of 1.65%. To the mixture were then added 3.6 g of trimethylolpropane and 4.0 g of carbodihydrazide. The reaction temperature was raised to 110° C. for two hours and then to 135° C. for two additional hours at which time the free isocyanate content was 0.45%. While at this temperature, a total of 8 g of stannous octoate (T-9, Air Products) was added in three portions. The product was poured into an aluminum foil tray, allowed to cool and then broken into small pieces for storage. Blocked NCO content (calculated) 26.7%, content of structural units corresponding to the formula, —CO—NH—NH—CO, 1.7%.

EXAMPLE 2

A product was made according to the procedure of Example 1 except that stannous octoate was not added at the end of the reaction. Blocked NCO content (calculated) 27.1%, content of structural units corresponding to the formula, —CO—NH—NH—CO, 1.8%.

EXAMPLE 3

A product was prepared according to the procedure of Example 1 using 209.9 g of bis(4-isocyanatocyclohexyl) methane, 149.2 of ε-caprolactam, 8.05 g of trimethylol propane and 4.5 g of carbohydrazide. No stannous octoate was added to the product. Blocked NCO content (calculated) 21.3%, content of structural units corresponding to the formula, —CO—NH—NH—CO, 1.9%.

EXAMPLE 4

A mixture of 211.2 g of bis(4-isocyanatohexyl) methane, 3.6 g trimethylolpropane and 16.6 g of an adduct mixture prepared from hydrazine hydrate and propylene carbonate (as described) was heated to 100 C. for thirty minutes. To the mixture were added, in three portions, 151.4 g of ε-caprolactam over a one hour period. The mixture was heated to 125° C. for 6 hours at which time the free isocyanate content was 0.47%. The product was poured into an aluminum tray, cooled to room temperature, and broken into smaller pieces for storage. Blocked NCO (calculated) 24.3%, content of structural units corresponding to the formula, —CO—NH—NH—CO, 3.8%.

EXAMPLE 5

A product was prepared according to the procedure of Example 4 except that at the end of the reaction 3.8 g of stannous octoate was blended into the mixture prior to pouring into aluminum trays. Blocked NCO content (calculated) 24.0%, content of structural units corresponding to the formula, —CO—NH—NH—CO, 3.7%.

EXAMPLE 6

A product was prepared according to the procedure of Example 1 using 179 g of isophorone diisocyanate, 163.9 of ε-caprolactam, 3.6 g trimethylolpropane, 4.0 g of carbohydrazide and 8.0 g of stannous octoate. Blocked NCO content (calculated) 30.4%, content of structural units corresponding to the formula, —CO—NH—NH—CO, 2.0%.

EXAMPLE 7 (COMPARISON)

A product was prepared according to the procedure of Example 1 from 211.9 g of bis(4-isocyanatocyclohexyl) methane, 163.9 g of ε-caprolactam, 7.6 g of trimethylol propane and 8.0 g of stannous octoate. Blocked NCO content (calculated) 26.7%, content of structural units corresponding to the formula, —CO—NH—NH—CO, 0.0%.

EXAMPLE 8 (COMPARISON)

A product was prepared according to the procedure of Example 1 from 217 g of isophorone diisocyanate, 158.2 of ε-caprolactam, 24.8 g of trimethylol propane and 11.2 g of stannous octoate. Blocked NCO content (by calculation) 24.4%, content of structural units corresponding to the formula, —CO—NH—NH—CO, 0.0%.

APPLICATION EXAMPLES

The products of Examples 3 and 4 were evaluated in a powder coatings formulation as described in Table I. The components were melt extruded at ca. 115° C. in a ZDSK 28 extruder (Werner and Pfleiderer). The melt was cooled to room temperature, pulverized and run through a 90 micron sieve to remove large particles. The powder was then electrostatically applied to a metal panel. The bake schedules and film evaluations are shown in Table II.

Test Definitions

Gloss: Specular gloss measured with a Gardner gloss meter at a 60° angle to the coated plate.

Acetone Resistance: A cotton ball saturated with acetone was rubbed back and forth over the film 50 times. After 5 minutes recovery the coating was scratched with a fingernail and judged by the following rating scale:

0—No Effect

1—Film softened at surface but not through to substrate

2—Film completely softened and disbonded from substrate

All amounts shown in Table I are in parts by weight.

TABLE I

| | Application Example | | | |
|---|---|---|---|---|
| | 9 | 10 | 11 | 12 |
| Acrylic Resin[1] | 39.2 | 35.2 | 39.2 | 35.2 |
| Blocked Polyisocyanate-Example 3 | | | 14.9 | 18.9 |
| Blocked Polyisocyanate-Example 4 | 14.9 | 18.9 | | |
| Flow Modifier[2] | 5.9 | 5.9 | 5.9 | 5.9 |
| Pigment[3] | 40 | 40 | 40 | 40 |

1. Joncryl 587 (S.C. Johnson)
2. Crelan U502MB-A (Bayer AG)
3. Titanium Dioxide R-KB-A (Bayer AG)

TABLE II

| | Application Examples | | | |
|---|---|---|---|---|
| | 9 | 10 | 11 | 12 |
| Baked 10 min. @ 200° C. | | | | |
| Film Thickness (Microns) | 58–66 | 62–66 | 58–64 | 58–62 |
| Gloss | 32 | 37 | 31 | 38 |
| Acetone Resistance | 0/1 | 0/1 | 0/1* | 0/1 |
| Baked 15 min. @ 200° C. | | | | |
| Film Thickness (Microns) | 56–60 | 60–64 | 56–62 | 58–64 |
| Gloss | 25 | 36 | 29 | 38 |
| Acetone Resistance | 0/1* | 0/1* | 0/1 | 0/1 |
| Whiteness (Berger) after overbake | 75.1 | 74.2 | 76.9 | 78.2 |
| 15 min/200° C. | 74.1 | 73.1 | 75.4 | 76.6 |
| 20 min/220° C. | 71 | 71.3 | 74.5 | 73.5 |

*Some additional gloss reduction noted.

APPLICATION EXAMPLE 13

The blocked polyisocyanates from Examples 1 and 2 and Comparison Example 7 were evaluated as crosslinkers for a hydroxyl functional acrylic. A pigmented dispersion of the polyhydroxy polyacrylate was prepared using the formulation and procedure described in Table 1A. Each example was combined with a sufficient quantity of pigmented polyol to formulate a coating material having a NCO:OH equivalent ratio of 1:1. These combination weight ratios are listed on Table 2A. Each prepared coating sample, after thorough agitation, was applied by spray to pretreated steel and aluminum anodized panels. Each panel was air dried for 20–40 minutes and then cured at 200° C.×10 minutes in a forced air oven. These coatings were subsequently tested and the results are listed in Table 3A.

Test Definition

1) Gloss: Coating gloss was measured at both 60° and 20° using a Gardner gloss meter.
2) MEK Resistance: A MEK saturated cotton ball rubbed (Double Rubs) repeatedly (100 times) back and forth over the coatings surface. Observations, both visual and physical, are made immediately upon completion of the test.
Pendulum Hardness: Coating hardness was measured using an ERICKSEN Pendulum Hardness Model #299/300. Values are reported in seconds.

TABLE 1A

| | | pbw | |
|---|---|---|---|
| Acrylic Resin Solution | (1) | 38.2 | Solids content = 51.7% |
| Pigment | (2) | 34.4 | eq. wt. pigmented 3480 |
| Flow Modifiers | (3) | 1.0 | polyol |
| Solvent | (4) | 26.4 | |
| | Total | 100.0 | |

(1) Joncryl 587 (S.C. Johnson) 45% solids in MAK.
(2) Ti-Pure R-960, DuPont.
(3) 7 parts 381.01 CAB (Eastman) 10% in PMA, 2 parts Modiflow (Monsanto) 10% in PM Acetate, 1 part MPA-60X (NL Industries).
(4) Solvent blend of PM Acetate (45 parts), Butyl Acetate (17 parts), and Cyclohexanone (38 parts).

Procedure

The polyhydroxy polyacrylate was reduced to 45% solids in methyl n-amyl ketone (MAK). The flow modifiers and reducing solvents were slowly stirred into the resin solution. The pigment was ground into this solution using a shaker mill. Grinding was stopped when a Hegman of 5 or less was achieved.

TABLE 2A

URETHANE HARDENER/ACRYLIC POLYOL COMBINATION RATIOS

| Example # (pbw) | % NCO | Eq. wt. | Polyol(1): Hardener wt. Ratio |
|---|---|---|---|
| 1 | 15.5 | 271 | 92.8:7.2 |
| 2 | 15.9 | 264 | 92.9:7.1 |
| 7 (Comp) | 14.5 | 290 | 92.3:7.7 |

(1)Pigmented Polyol described in TABLE 1A.

TABLE 3A

| | Application Examples | | |
|---|---|---|---|
| | 1 | 2 | 7 (Comp.) |
| Gloss (%) | | | |
| 60° | 7 | 22 | 33 |
| 20° | 0 | 0 | 6 |
| MEK Double Rub Resistance (1) | S, Du, AB | S, Du, AB | |
| Pendulum Hardness (Sec) | 127 | 122 | 155 |

TABLE 3A-continued

| | Application Examples | | |
|---|---|---|---|
| | 1 | 2 | 7 (Comp.) |
| Film Thickness - mils (2) | 1.0 | 1.0 | 1.0 |

(1) S = Softened
Du = Dulled
AB = Abraided
(2) Film Thickness 1.0 ± 0.2 mils

APPLICATION EXAMPLE 14

The blocked polyisocyanates of Examples 6 and 8 (Comp) were evaluated in accordance with application Example 13. These two hardeners were blended with the pigmented polyol portion at a ration (pbw) of 93.2:6.8 and 92.8:7.2, respectively. The coatings products were spray applied over pretreated steel and aluminum anodized panels. After a 20–40 minute flash time, the coatings were cured for 10 minutes at 200° C. Gloss measurements were taken and are listed on Table 1B.

TABLE 1B

| | Gloss | |
|---|---|---|
| Example # | 60° | 20° |
| 6 | 6 | 1 |
| 8 (Comp) | 87 | 63 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition comprising
   a) a polyisocyanate having a content of isocyanate groups blocked by blocking agents of about 10 to 35% by weight and containing about 0.5 to 10.0% by weight of structural units corresponding to the formula

—CO—NH—NH—CO— and
   b) a polyhydroxy polyacrylate in an amount sufficient to provide an equivalent ratio of blocked isocyanate groups to hydroxyl groups of about 0.5:1.0 to 2.0:1.0.

2. The coating composition of claim 1 wherein said polyisocyanate is based on a diisocyanate containing aliphatically- and/or cycloaliphatically-bound isocyanate groups.

3. The coating composition of claim 1 wherein said blocking agent comprises ε-caprolactam.

4. The coating composition of claim 1 wherein said structural units are incorporated by a compound selected from the group consisting of carbohydrazide and reaction products of hydrazine with cyclic alkylene carbonates.

5. The coating composition of claim 4 wherein said cyclic alkylene carbonates comprise 2-oxo-4-methyl-1,3-dioxolane.

6. A coating composition comprising
   a) a polyisocyanate having a content of isocyanate groups blocked by blocking agents of about 10 to 35% by weight and containing about 1.0 to 5.0% by weight of structural units corresponding to the formula

—CO—NH—NH—CO—, said polyisocyanate comprising the reaction product of a diisocyanate containing aliphatically- and/or cycloaliphatically-bound isocyanate groups, ε-caprolactam and a compound selected from the group consisting of carbohydrazide and reaction products of hydrazine and alkylene carbonates and
b) a polyhydroxy polyacrylate in an amount sufficient to provide an equivalent ratio of blocked isocyanate groups to hydroxyl groups of about 0.5:1.0 to 2.0:1.0.

7. The coating composition of claim 6 wherein said cyclic alkylene carbonates comprise 2-oxo-4-methyl-1,3-dioxolane.

8. The coating composition of claim 6 wherein said compound comprises carbohydrazide.

9. A coating prepared from a coating composition comprising
a) a polyisocyanate having a content of isocyanate groups blocked by blocking agents of about 10 to 35% by weight and containing about 0.5 to 10.0% by weight of structural units corresponding to the formula

—CO—NH—NH—CO— and
b) a polyhydroxy polyacrylate in an amount sufficient to provide an equivalent ratio of blocked isocyanate groups to hydroxyl groups of about 0.5:1.0 to 2.0:1.0.

10. The coating of claim 9 wherein said polyisocyanate is based on a diisocyanate containing aliphatically- and/or cycloaliphatically-bound isocyanate groups.

11. The coating of claim 9 wherein said blocking agent comprises ε-caprolactam.

12. The coating of claim 9 wherein said structural units are incorporated by a compound selected from the group consisting of carbohydrazide and reaction products of hydrazine with cyclic alkylene carbonates.

13. The coating of claim 12 wherein said cyclic alkylene carbonates comprise 2-oxo-4-methyl-1,3-dioxolane.

14. A coating prepared from a coating composition comprising
a) a polyisocyanate having a content of isocyanate groups blocked by blocking agents of about 10 to 35% by weight and containing about 1.0 to 5.0% by weight of structural units corresponding to the formula

—CO—NH—NH—CO—, said polyisocyanate comprising the reaction product of a diisocyanate containing aliphatically- and/or cycloaliphatically-bound isocyanate groups, ε-caprolactam and a compound selected from the group consisting of carbohydrazide and reaction products of hydrazine and alkylene carbonates and
b) a polyhydroxy polyacrylate in an amount sufficient to provide an equivalent ratio of blocked isocyanate groups to hydroxyl groups of about 0.5:1.0 to 2.0:1.0.

15. The coating of claim 14 wherein said cyclic alkylene carbonates comprise 2-oxo-4-methyl-1,3-dioxolane.

16. The coating of claim 14 wherein said compound comprises carbohydrazide.

* * * * *